United States Patent
Greene et al.

(10) Patent No.: US 12,222,047 B2
(45) Date of Patent: Feb. 11, 2025

(54) ROTARY VALVE WITH ENCODER ON ROTOR

(71) Applicant: TECAN TRADING AG, Männedorf (CH)

(72) Inventors: John Greene, San Jose, CA (US); Michael John Kennedy, Los Gatos, CA (US); Torleif Ove Björnson, Gilroy, CA (US); Werner Hälg, Männedorf (CH)

(73) Assignee: TECAN TRADING AG, Männedorf (CH)

( * ) Notice: Subject to any disclaimer, the term of this patent is extended or adjusted under 35 U.S.C. 154(b) by 36 days.

(21) Appl. No.: 17/822,666

(22) PCT Filed: Nov. 9, 2020

(86) PCT No.: PCT/IB2020/000945
§ 371 (c)(1),
(2) Date: Aug. 26, 2022

(87) PCT Pub. No.: WO2022/096911
PCT Pub. Date: May 12, 2022

(65) Prior Publication Data
US 2023/0304602 A1 Sep. 28, 2023

(51) Int. Cl.
*F16K 37/00* (2006.01)
*F16K 11/08* (2006.01)
*F16K 31/04* (2006.01)

(52) U.S. Cl.
CPC .......... *F16K 37/0041* (2013.01); *F16K 11/08* (2013.01); *F16K 31/042* (2013.01)

(58) Field of Classification Search
None
See application file for complete search history.

(56) References Cited

U.S. PATENT DOCUMENTS 6,779,557 B2 * 8/2004 Weiss .................... F16K 11/074
  137/625.11
8,179,126 B2 * 5/2012 Li .......................... G01D 5/145
  324/207.2

(Continued)

FOREIGN PATENT DOCUMENTS

EP  2459915 B1  6/2013
EP  1932555 B2  6/2016

(Continued)

OTHER PUBLICATIONS

Chatel, C. (Authorized officer), International Preliminary Report on Patentability issued May 19, 2023 in corresponding International Application No. PCT/IB2020/00945, 8 pages.

(Continued)

*Primary Examiner* — Angelisa L. Hicks
(74) *Attorney, Agent, or Firm* — MH2 Technology Law Group LLP

(57) ABSTRACT

A rotary valve comprises a stator member with a stator face, the stator member having at least two stator channels for conducting a fluid and opening into the stator face; a rotor member with a rotor face facing and in contact with the stator face, the rotor member having a rotor channel in the rotor face, wherein the rotor member is rotatable with respect to the stator member about a rotation axis, such that in a conducting position, the rotor channel interconnects the at least two stator channels to be in fluid communication; and a rotary encoder assembly adapted for determining a rotary position of the rotor member, the rotary encoder assembly comprising an encoder member and an encoder module, which is adapted to sense a rotary position of the encoder member. The encoder member is rigidly connected to the rotor member and surrounds the rotor member.

11 Claims, 4 Drawing Sheets

(56) References Cited

U.S. PATENT DOCUMENTS

| | | | |
|---|---|---|---|
| 9,641,108 B2 | 5/2017 | Suda et al. | |
| 2005/0167577 A1* | 8/2005 | Kawai | G01D 5/3473 |
| | | | 250/231.13 |
| 2009/0189110 A1 | 7/2009 | Dolenti et al. | |
| 2011/0303304 A1* | 12/2011 | Tower | F16K 3/08 |
| | | | 29/401.1 |
| 2016/0056691 A1* | 2/2016 | Hale | H02K 11/21 |
| | | | 310/68 B |
| 2020/0182362 A1 | 6/2020 | Wada et al. | |

FOREIGN PATENT DOCUMENTS

| | | | | |
|---|---|---|---|---|
| GB | 2541031 A | | 2/2017 | |
| JP | H05346178 A | * | 12/1993 | |
| JP | 2016090266 A | * | 5/2016 | |
| WO | WO-03042586 A1 | * | 5/2003 | ............... F16K 3/08 |
| WO | 2005/080843 A1 | | 1/2005 | |
| WO | 2017/037072 | | 3/2017 | |

OTHER PUBLICATIONS

Authori Unknown, OED Module RVM Rotary Valve product brochure, "The Ultra-Low Internal Volume Rotary Valve," date published unknown, 3 pages.

PCT International Search Report and Written Opinion issued Aug. 25, 2022 in corresponding International Application No. PCT/IB2020/00945, 10 pages.

\* cited by examiner

B - B

ROTARY VALVE WITH ENCODER ON ROTOR

CROSS-REFERENCE TO RELATED APPLICATIONS

The present application is the national stage entry of International Patent Application No. PCT/162020/000945, filed on Nov. 9, 2020, and published as WO 2022/096911 A1 on May 12, 2022, the disclosure of which is incorporated by reference herein in its entirety.

FIELD OF THE INVENTION

The invention relates to a rotary valve and a method for controlling the rotary valve.

BACKGROUND OF THE INVENTION

Rotary valves may be used in laboratory automation systems for distributing liquids, such as reagents, dilutions, samples, etc. A rotary valve usually comprises a stator member with stator channels and a rotor member, which comprises a rotor channel. Dependent on different rotary positions, the rotor channel interconnects different stator channels with each other. A pump may convey a liquid from a first container and/or channel into the rotary valve and the rotary valve may distribute the liquid into other containers and/or channels dependent on its rotor position. The rotary valve also may draw from one of a plurality of source containers and may distribute the fluid into a common outlet.

Microfluidic and flow cell applications require precise pulsation free constant flow rates and clean "cut over" between fluids with minimal carry-over. For this, a highly precise alignment between the openings of the stator channels and the rotor channel is required. Traditional valve designs are usually limited by backlash in a valve drive and by manufacturing tolerances on the location of the openings in the stator member and rotor member, in particular if these are made of materials such as ceramic.

EP 2 459 915 B1 shows a rotary valve with an encoder assembly arranged between a gear and rotor of the valve.

SUMMARY OF THE INVENTION

The objective of the invention is a rotary valve with a high alignment between stator channel openings and the rotor channel and low carry-over when switching fluids.

This objective is met by the subject-matter of the independent claim. Further exemplary embodiments are evident from the dependent claims and the following description.

An aspect of the invention relates to a rotary valve comprising a stator member with a stator face, the stator member having at least two stator channels for conducting a fluid and opening into the stator face, and a rotor member with a rotor face facing and in contact with the stator face, the rotor member having at least one rotor channel in the rotor face. The rotor member is rotatable with respect to the stator member about a rotation axis, such that in a conduction position, the rotor channel interconnects the at least two stator channels to be in fluid communication. The stator face and the rotor face may be parallel and/or identically shaped. The rotation axis may be aligned symmetrically to the stator face and the rotor face.

The stator member and the rotor member may be accommodated in a housing of the rotary valve, wherein the stator member may be statically connected with the housing and the rotor member may be rotatably connected with the housing, for example via a bearing. The rotor member may be rotated by a step or other electronically controllable motor, which may be mechanically connected to the rotor member via a gear. A pump, such as an automatically actuated syringe, may be connected to one of the stator channels. The housing of the rotary valve furthermore may comprise means for pressing the rotor face against the stator face, such as a spring.

There may be more than one conduction position. It may be that the stator member has a stator channel with a central opening that opens into the rotor channel in any conduction position. It may be that the stator member has one or more eccentric stator channels with an opening spaced apart from the rotation axis. In a specific conduction position, one of the eccentric stator channels may be connected with the stator channel with the central opening.

The rotor channel may be a groove in the rotor face. Over its complete extension, the rotor channel always may be opened towards the rotor face. The stator channels may have openings in the stator face, which in a conduction position are aligned with the rotor channel. It also may be that the rotor channel protrudes through the rotor member.

The rotary valve further may comprise a rotary encoder assembly adapted for determining a rotary position of the rotor member. The rotary encoder assembly may comprise an encoder member and an encoder module, which is adapted to sense a rotary position of the encoder member. The rotary position may be encoded as an angle with respect to a zero position of the rotor member. The rotary position may be output as a relative or absolute digital value by the encoder module. The encoder module may comprise circuitry for evaluating a sensor signal of a sensor, which senses the rotary position of the encoder member. Due to the rigid connection, the rotary position of the encoder member is the rotary position of the rotor member.

The encoder member may have physical properties, which vary in a direction around the rotation axis, such as a differing magnetic strength, different translucence, etc. Such a physical property may be sensed by the sensor and transformed into the rotary position of the rotor member by the encoder module.

The encoder module may be attached to a housing of the rotary valve.

The encoder member may be rigidly connected to the rotor member and/or may surround the rotor member. Rigidly connected may mean that a rotary movement of the rotor member results in exact the same rotary movement of the encoder member. The encoder member may be directly attached to the rotor member, for example an outer surface of the rotor member. Such an attachment and/or the rigid connection may be made by gluing, screwing, welding, etc.

With the encoder member directly connected to the rotor member, a high precision of rotor positioning can be achieved. The alignment of rotor member and stator member and in particular of the openings of the stator channels with the rotor channel in the conduction position can be increased. Furthermore, backlash effects caused by a shaft and/or a gear interconnecting a motor with the rotor member may be eliminated. These backlash effects also may change during the lifetime of the rotary valve.

A misalignment between the moving rotor member and the fixed stator member may be avoided, which misalignment may result in a partial occlusion of the fluid path provided by the stator channel and the rotor channel. Such a misalignment may result in a partial path occlusion in the rotary valve and may cause a variation in flow rate. In the end, a fluid delivery accuracy variation due to the valve alignment error may be caused, and/or unintended mixing may be caused when flowing after switching between fluids. Such misalignment, path occlusion and/or fluid delivery accuracy variation may be avoided with the encoder member directly connected to the rotor member.

According to an embodiment of the invention, the encoder member may comprise or may be a ring surrounding the rotor member. The encoder member may be a ring-shaped component attached to a cylindrical outer surface of the rotor member. Along the ring, a physical property of the rotor member may vary, which may be sensed by a sensor of the encoder module, when during a rotation the ring moves along the static and/or fixed sensor.

According to an embodiment of the invention, the rotor member may comprise a cylindrical body. The cylindrical body may be provided at an end of the rotor member directed towards a shaft for rotating the rotor member. The encoder member may be attached to an outer surface of the cylindrical body of the rotor member.

According to an embodiment of the invention, the cylindrical body may comprise an opening for receiving a shaft of the rotary valve. At least a part of the rotor member may be cup-shaped. It may be that a bottom of the cup provides the rotor face. The encoder member may surround the opening for receiving the shaft. This may result in a more compact design of the rotary valve.

According to an embodiment of the invention, the rotor member may comprise a rotor body providing the rotor face, which may be made one-piece with the cylindrical body. Both the cylindrical body and the rotor body may be made of ceramics. The rotor member may comprise a cylindrical surface to which the encoder member is connected and a rotational symmetric rotor face, which faces the stator face.

According to an embodiment of the invention, the rotor face and the stator face are planar. In this case, the rotor face and the stator face may be aligned orthogonally to the rotation axis.

According to an embodiment of the invention, the rotor face and the stator face are rotational symmetric with respect to the rotation axis. For example, the rotor face and the stator face may be shaped like a part of a cylinder surface. In particular, the rotor body of the rotor member may be a rotational symmetric body with respect to the rotation axis.

According to an embodiment of the invention, the rotary valve further may comprise a housing for accommodating the rotor member and the stator member and a rotary bearing for mounting the rotor member in the housing. The rotor member may be rotatably mounted in the housing, such that it is rotatable about the rotation axis. The stator member may be rigidly mounted to the housing.

The bearing may be attached to a cylindrical body of the rotor member, in particular to an outer surface of the cylindrical body. The bearing may be a sliding bearing or a ball bearing.

Also at the side with the opening for a shaft, a bearing may be attached to the rotor member. Here, the rotor member may be guided by a ball bearing to eliminate or at least reduce occlusion between the rotor member and the stator member due to radial misalignment.

According to an embodiment of the invention, the encoder member may be arranged adjacent to the bearing, i.e. may be attached to the outer surface of the cylindrical body of the rotor member besides the bearing.

According to an embodiment of the invention, the bearing surrounding the rotor member may protrude over the rotor face and/or protrude into a circular groove of the stator member. An overall length of the rotary valve may be reduced in this way.

According to an embodiment of the invention, the stator member may comprise a circular groove surrounding the stator face. With the groove, the stator may be designed more compact. The circular groove also may provide space so that any leakage between the rotor member and stator member may leave the rotary valve through a drain hole, rather than forcing through the sealed bearing and possibly damaging the bearing and/or valve.

According to an embodiment of the invention, the rotor member may comprise a ring shaped flange running around a cylindrical body of the rotor member. The ring-shaped flange may surround the opening for receiving a shaft. The encoder member may be arranged between the flange and the ring-shaped bearing for mounting the rotor member in a housing of the rotary valve. The flange and the bearing may be used for positioning the encoder member between them.

According to an embodiment of the invention, the encoder member may comprise magnetic poles and the encoder module is adapted for sensing the magnetic poles, for example via a Hall sensor. The encoder assembly may be a Hall effect magnetic encoder assembly. The encoder member may be a cylindrical magnet. This may optimize packaging and/or may minimize the possibility of particulates or stray droplets negatively impacting function and/or positioning.

The encoder member in the form of a ring magnet for a Hall effect device may be placed directly on the rotor member to eliminate alignment error between rotor channel and stator channel openings during operation. The diameter of the stator channel may be 0.8 mm. The encoder member may underpin the importance of precise alignment between a rotor channel and stator channel.

The ring magnet may have two tracks. One track may provide an absolute home position and one track may provide a relative positioning.

According to an embodiment of the invention, the encoder assembly may be an optical encoder assembly. The encoder member may be a ring and/or wheel with openings encoding a position. The encoder module may comprise a light source, which may be occluded by the ring and/or wheel with openings and a sensor for sensing the light.

According to an embodiment of the invention, the encoder member may be molded to the rotor member. For example, in the case of a magnetic encoder, the encoder member may be overmolded.

According to an embodiment of the invention, the rotor member and/or the stator member may be made of a ceramics or polymeric material. The stator member and/or the rotor member may be made of a ceramics material, e.g. alumina, metal, e.g. stainless steel, or polymer, e.g. PEEK (Polyetheretherketone) or ETFE (Ethylene Tetrafluoroethylene). The stator channels may be made of bores machined in the material before or after sintering or formed by inserting a wire before pressing or molding, which are removed after forming. The rotor channel may be made by machining a groove into the ceramics material. It also may be that the rotor member and/or the stator member are 3D printed, for example by laser sintering.

According to an embodiment of the invention, the rotary valve further comprises a motor for driving the rotor member. The motor may be an electrical motor and/or a step motor, which is controlled by a controller to actuate the movement of the rotor member.

According to an embodiment of the invention, the rotary valve further comprises a second rotary encoder assembly for determining a rotary position of a shaft of the motor. An encoder member of the second rotary encoder assembly may be attached and/or directly connected to the shaft of the motor. The shaft of the motor may be connected to a gear, which itself is connected to the rotor member. With the two encoder assemblies, the backslash of the gear may be determined. The backlash may be used as parameter for controlling the rotary valve.

Furthermore, the second rotary encoder assembly may be used for controlling the motor, while the first encoder assembly, which is directly connected to the rotor member, may be used for controlling the positioning of the rotor member.

The second rotary encoder assembly may be based on a magnetic encoder (such as a Hall effect encoder) or an optical encoder.

According to an embodiment of the invention, the rotary valve further comprises a gear interconnecting the motor and the rotor member. For example, the gear may be a strain wave gear (also called harmonic gear) or a planetary gear. This may further reduce the size of the rotary valve.

A further aspect of the invention relates to a method for controlling the rotary valve such as described above and below. It may be that the rotary valve comprises a controller adapted for performing such a method. The controller may comprise a processor and the method may be performed by a computer program, which is stored in the controller and executed by the processor. Further aspects of the invention relates to such a computer program and a computer-readable medium, in which such a computer program is stored.

The encoder module may be a part of such a controller. It also may be that the encoder module and the controller are two different members of the rotary valve, which are interconnected by a cable for data communication.

According to an embodiment of the invention, the method comprises: controlling the motor to generate torque; controlling a position of the rotor member in closed loop by comparing a position determined by the rotary encoder assembly of the rotor member with a desired position and by stopping the motor, when the desired position is reached. The positioning of the rotor member may be controlled with another control loop as the control of the motor. This may improve an alignment between the rotor member and the stator member. A possible backlash of a gear and/or of other mechanical members between the motor and the rotor member may be avoided.

According to an embodiment of the invention, the method further comprises: controlling the motor in closed loop to generate a constant torque. This may reduce sticking of the rotor member to the stator member by optimally using the motor current to rotate the motor with minimal losses, maximizing available torque The two encoders may be used for detecting wear and tear, e.g. by increased backlash. Measuring backlash may also be used for predicting break down (predictive maintenance)

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION

Figure 1:
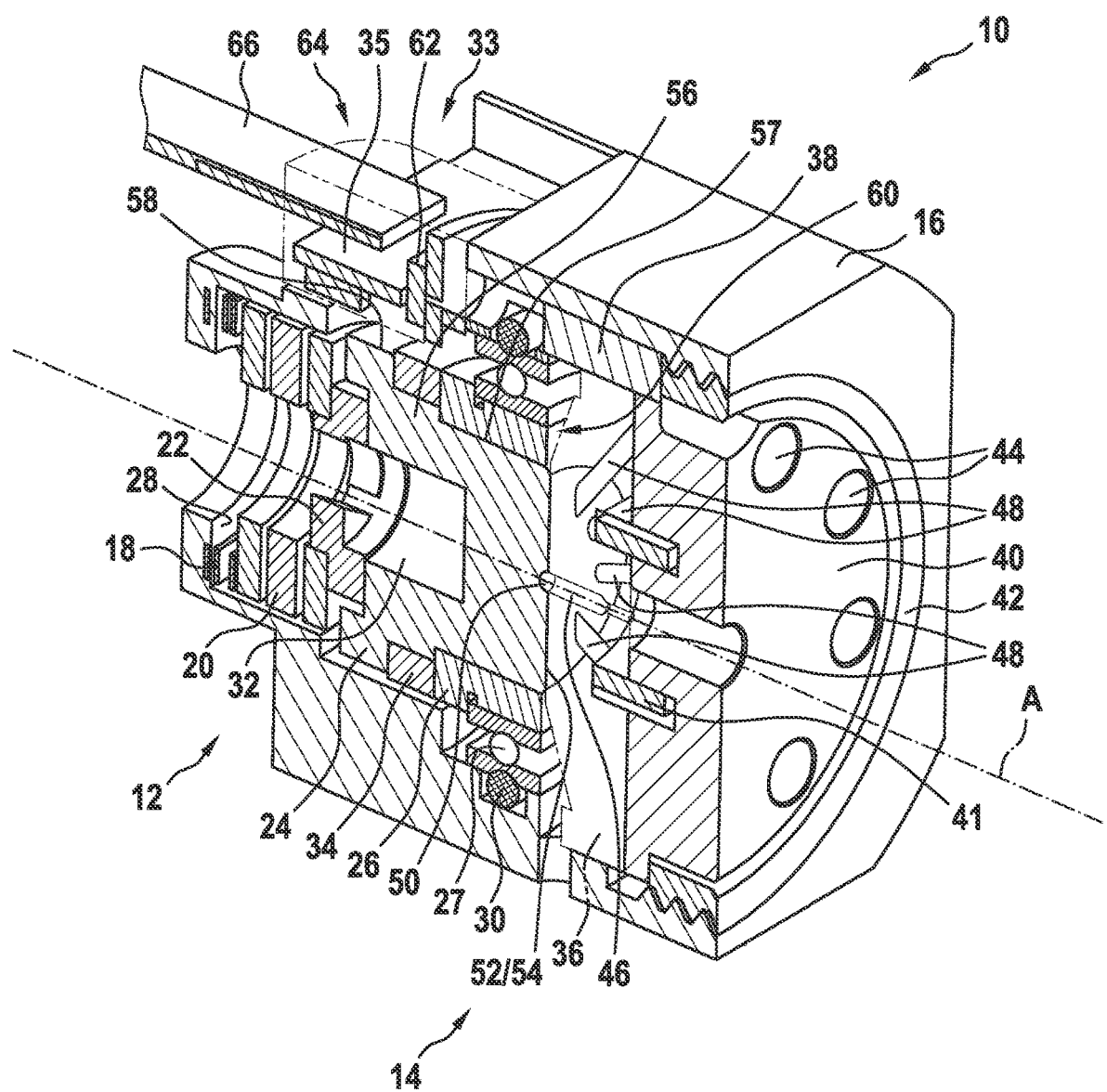
FIG. 1 shows a perspective sectional view of a part of a rotary valve according to an embodiment of the invention.

FIG. 1 shows a rotary valve 10 with a rotor assembly 12 and a stator assembly 14 in a housing 16.

The rotor assembly 12 comprises a spring element 18, a bearing 20 (such as a thrust bearing), a coupler 22, a rotor member 24, bearing sleeve 26, and a sliding bearing 27. The spring element 18, which lies on an annular ground wall 28 of the housing 16, presses the rotor member 24 via the bearing 20 and the coupler 22 against the stator assembly 14. A sealing ring 30 provides a tightening between the rotor assembly and the housing 16.

The rotor member 24 is rotatably mounted to the bearing 20 and rotatably mounted inside the sliding bearing 27. The rotor member 24 is adapted to rotate about a rotation axis A. Through the annular ground wall 28, a shaft of a gear and/or an electrical motor may be mounted into the coupler 22 and into an opening 32 of the rotor member 24.

A rotary encoder assembly 33 comprises an encoder member 34, which is mounted to the rotor member 24 besides the sliding bearing 27, and an encoder module 35, which is mounted to the housing 16. The encoder member 34 is rigidly connected to the rotor member 24 and surrounds the rotor member 24. For example, the encoder member may be molded and/or held in place by bonding or other parts to the rotor member 24.

The stator assembly 14 comprises a stator member 36, which is fixed to the housing 16. A pin 38 prevents a rotation of the stator member 36. A port member 40 of the stator assembly 14 is arranged and aligned on the stator member 36 via alignment ring (or pins) 41 and fixed into the housing with a screw ring 42. The port member 40 comprises connection ports 44 for connecting lines or hoses to the rotary valve 10. The connection ports 44 are substantially cylindrical openings extending parallel to the rotation axis.

The stator member 36 comprises stator channels 46, 48, which enter into the connection ports 44. The rotor member 24 comprises a rotor channel 50, which in specific rotor positions interconnects the stator channel 46 and one of the stator channels 48. In such a rotor position, a fluid can flow from the central port 44 to one of the other ports 44 or vice versa. In other positions, the fluid flow may be blocked.

The rotor member 24 has a planar, disk-shaped rotor face 52 in which the rotor channel 50 is provided as a groove. The stator member 36 has a planar, disk-shaped stator face 54, which faces and is in contact with the rotor face 52. The spring element 18 presses the rotor face 52 against the stator face 54, such that a fluid tight connection is generated.

The rotor member 24 comprises a cylindrical body 56 with the opening 32 for receiving a shaft at one end and a rotor body 57 providing the rotor face 52 at the other end. The bodies 56 and 57 may be made from the same material and/or may be made in one piece. The rotor face 52 as well as the stator face 54 is aligned orthogonal to the axis of rotation.

The coupler 22 is attached into the opening 32. The encoder member 34 is attached to an outer surface of the cylindrical body 56, wherein the encoder member 34 surrounds the opening 32.

The encoder member 34 is arranged between the bearing sleeve 26 and a flange 58 of the rotor member 24. The ring-shaped flange 58 runs around the cylindrical body 56 of the rotor member 24. At an inner side, the flange 58 accommodates the coupler 22.

The stator member 36 comprises a circular groove 60 surrounding the stator face 54. A part of the bearing 27 protrudes into the circular groove 60, which is used for collecting fluid, which may leave the room between the rotor face 52 and the stator face 54.

The encoder member 34 may be a ring-shaped magnet. The rotary position of the rotor member 24 may be evaluated by the encoder module 35 by sensing magnetic poles of the encoder member 34. In the case of a magnetic encoder member 34, the encoder member 34 may be completely molded into a mold material for molding it to the rotor member 24.

The encoder member 34 may comprise magnetic poles and the encoder module 35 may be adapted for sensing the magnetic poles with a sensor 62. The sensor 62 may be a Hall sensor. For example, the encoder member 34 comprises 8 magnetic pole pairs for determining a relative position and one index pole for determining an absolute position. This may result in a resolution of about 4000 to 16000 steps for 360°.

In general, the encoder member 34 comprises or is a ring surrounding the rotor member 24, which provides an encoding of a rotational position of the rotor member 24. Such an encoding may be provided magnetically or optically. As a further example, the encoder member 34 may comprise a ring with openings, wherein light, which runs through the openings or which is shielded by the ring between the openings, is sensed by the sensor 62, which in this case may be an optical sensor.

The encoder module 35 further may comprise circuitry 64 for evaluating the signal of the sensor 62 and for generating a digital signal encoding the rotary position, which then may be sent via a cable 66 to a controller for controlling the rotary valve 10.

Figure 2:
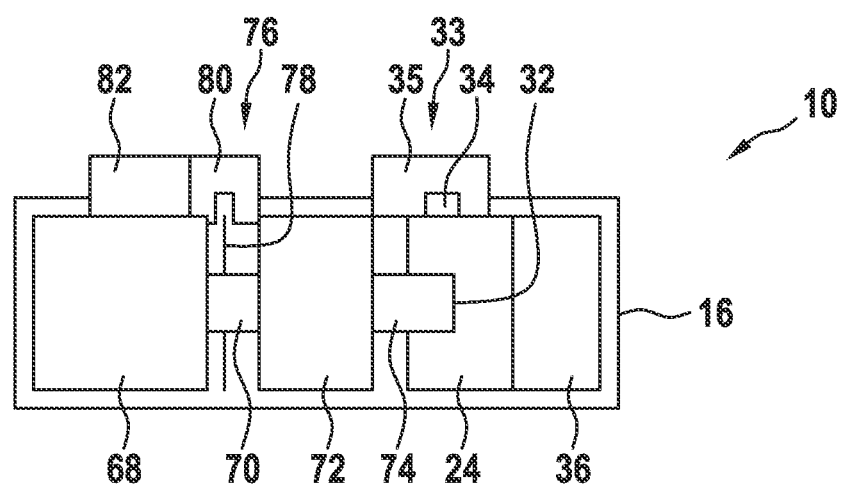
FIG. 2 shows a schematic cross-sectional view of a rotary valve according to an embodiment of the invention.

FIG. 2 shows a further embodiment of a rotary valve 10. The rotary valve 10 comprises a motor 68, which is connected via a first shaft 70 with a gear 72. The gear 72 is connected via a second shaft 74 with a rotor member 24. The rotary valve comprises further a stator member 36 and a housing 16. The motor 68 may be an electrical step motor and is used for driving the rotor member 24 via the gear 72, which may be a strain wave gear or a planetary gear.

A first rotary encoder assembly 33 with an encoder member 34 and an encoder module 35 is provided for determining a rotary position of the rotor member 24. The part of the rotary valve 10 with the rotary encoder assembly 33, the rotor member 24 and the stator member 36 may be designed as shown in FIG. 2.

A second rotary encoder assembly 76 with an encoder member 78 and an encoder module 80 is provided for determining a rotary position of the shaft 70 of the motor 68.

The encoder member 78 is attached to the shaft 70 of the motor 68. For example, the second rotary encoder assembly 76 may be based on a magnetic encoder or an optical encoder, such as described above. The encoder assembly 76 may be at the end of the motor, or at the output shaft of the motor.

A controller 82 of the rotary valve 10 receives the rotary position of the rotor member 24 determined by the rotary encoder assembly 33 and the rotary position of the motor 68 determined by the rotary encoder assembly 76.

Figure 3:
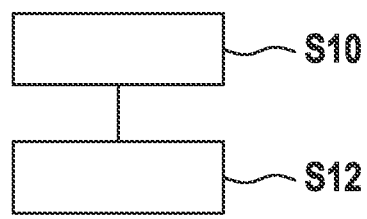
FIG. 3 shows a flow diagram for a method for controlling a rotary valve according to an embodiment of the invention.

A method that is performed by the controller 82 is illustrated in FIG. 3.

In step S10, the motor 68 is controlled in closed loop to generate a constant torque.

In step S10, the position of the rotor member 24 is controlled in closed loop by comparing the position determined by the rotary encoder assembly 33 with a desired position. The desired position is stored in the controller and defines a conducting or blocking position of the rotary valve 10.

When the desired position is reached, the motor controlled in step S10 to generate torque is stopped. For example, by setting the torque to be generated to 0.

Figure 4:
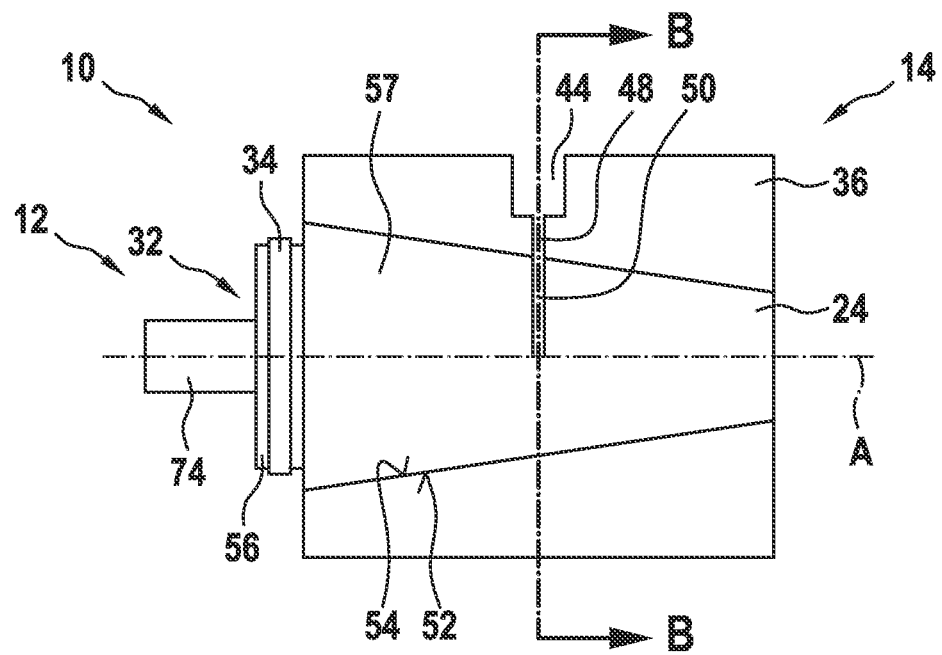
FIG. 4 shows a schematic cross-sectional view of a rotary valve according to an embodiment of the invention.
Figure 5:
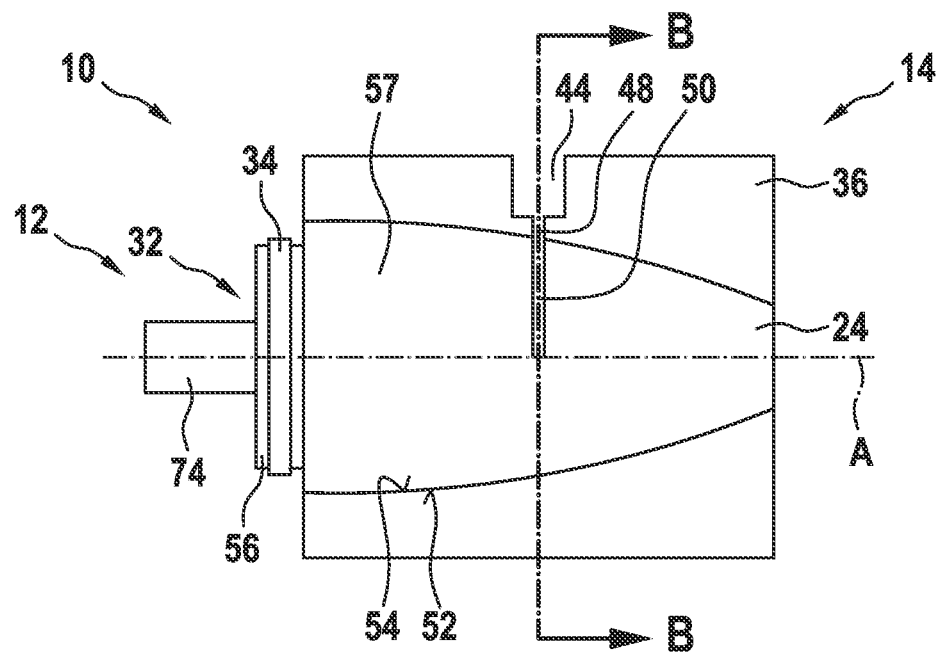
FIG. 5 shows a schematic cross-sectional view of a rotary valve according to an embodiment of the invention.
Figure 6:
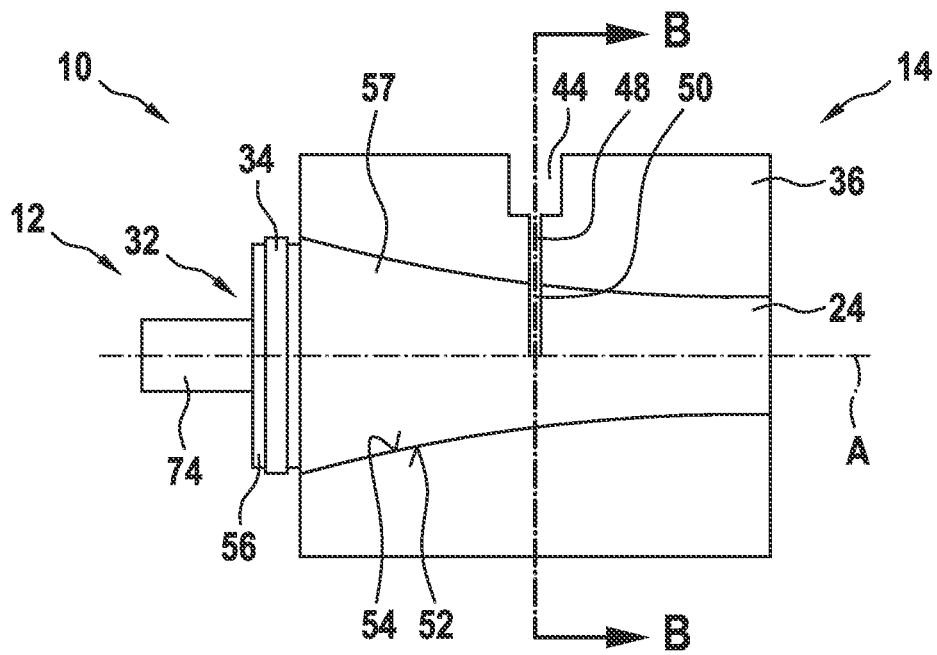
FIG. 6 shows a schematic cross-sectional view of a rotary valve according to an embodiment of the invention.

FIGS. 4 to 6 show further embodiments of a rotary valve with non-planar rotor face 52 and non-planar stator face 54. The rotary valves 10 shown in FIGS. 4 to 6 may comprise the same further components as shown in FIG. 1, when applicable.

As in FIG. 1, the rotor member 24 comprises a cylindrical body 56 with an opening 32 for receiving a shaft 74 at one end and a rotor body 57 providing the rotor face 52 at the other end. Again, the bodies 56 and 57 may be made from the same material and/or may be made in one piece. The encoder member 34 surrounds the cylindrical body 56. The rotor face 52 is an outer surface of the rotor body 57, which faces away from the axis A.

In FIG. 4, the rotor body 57 is a truncated cone, in which the rotor channel 50 is provided. The rotor face 52 and the stator face 54 are conical surfaces.

In general, as shown in FIGS. 5 and 6, the rotor face 52 and the stator face 54 may be surfaces rotational symmetric with respect to the axis A and/or the rotor body 57 may be a rotational symmetric with respect to the axis A. In FIG. 5, the rotor face 52 and the stator face 54 are bulged away from the axis A. In FIG. 6, the rotor face 52 and the stator face 54 are bulged towards the axis A.

Figure 7:
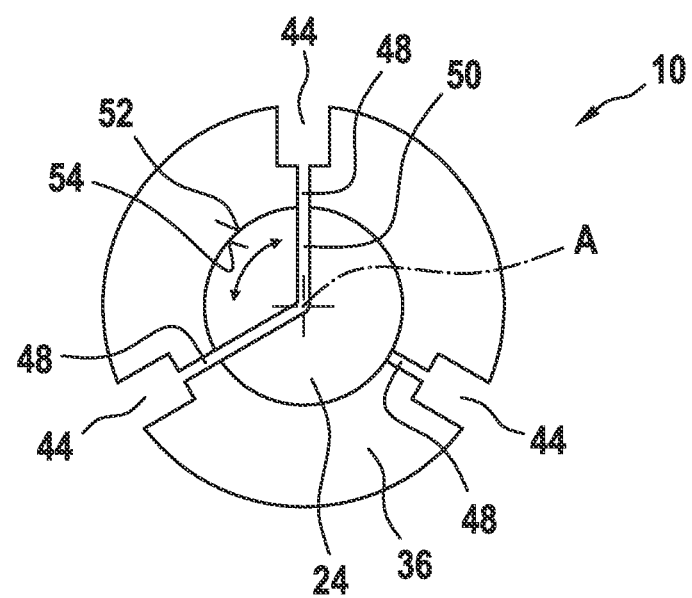
FIG. 7 shows a schematic cross-sectional view of a rotary valve according to an embodiment of the invention.

FIG. 7 shows a cross-section through the rotary valves 10 of FIGS. 4 to 6 along the plane B-B. The rotor channel 50 is a bent tube through the rotor body 57. The stator channels 48 and/or the parts of the rotor channel 50 are aligned orthogonal to the axis A.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A rotary valve, comprising:
a stator member with a stator face, the stator member having at least two stator channels for conducting a fluid and opening into the stator face;
a rotor member with a rotor face facing and in contact with the stator face, the rotor member having a rotor channel in the rotor face, wherein the rotor member is rotatable with respect to the stator member about a rotation axis, such that in a conducting position, the rotor channel interconnects the at least two stator channels to be in fluid communication;
a rotary encoder assembly adapted for determining a rotary position of the rotor member, the rotary encoder assembly comprising an encoder member and an encoder module, which is adapted to sense a rotary position of the encoder member;
a housing for accommodating the rotor member and the stator member; and
a rotary bearing for mounting the rotor member in the housing,
wherein the encoder member is arranged adjacent to the bearing
wherein the encoder member is rigidly connected to the rotor member and surrounds the rotor member,
wherein the rotor member comprises a cylindrical body,
wherein the rotor member comprises a rotor body providing the rotor face, which is made one-piece with the cylindrical body,
wherein the encoder member is attached to an outer surface of the cylindrical body,
wherein the cylindrical body comprises an opening for receiving a shaft of the rotary valve, and
wherein the encoder member surrounds the opening for receiving the shaft.

2. The rotary valve of claim 1,
wherein the encoder member comprises a ring surrounding the rotor member.

3. The rotary valve of claim 1,
wherein the rotor face and the stator face are planar; or
wherein the rotor face and the stator face are rotational symmetric with respect to the rotation axis.

4. The rotary valve of claim 1,
wherein the rotor member comprises a ring-shaped flange running around a cylindrical body of the rotor member and the encoder member is arranged between the flange and a ring-shaped bearing for mounting the rotor member in a housing of the rotary valve.

5. The rotary valve of claim 1,
wherein the encoder member comprises magnetic poles and the encoder module is adapted for sensing the magnetic poles.

6. The rotary valve of claim 1,
wherein the rotor member is made of a ceramics material; and/or
wherein the stator member is made of a ceramics material.

7. The rotary valve of claim 1, further comprising:
a motor for driving the rotor member.

8. The rotary valve of claim 7, further comprising:
a second rotary encoder assembly for determining a rotary position of a shaft of the motor;
wherein an encoder member of the second rotary encoder assembly is attached to the shaft of the motor.

9. The rotary valve of claim 7, further comprising:
a gear interconnecting the motor and the rotor member.

10. A method for controlling the rotary valve of claim 1, the method comprising:
controlling the motor to generate torque;
controlling a position of the rotor member in closed loop by comparing a position determined by the rotary encoder assembly of the rotor member with a desired position and by stopping the motor, when the desired position is reached.

11. The rotary valve comprising:
a stator member with a stator face, the stator member having at least two stator channels for conducting a fluid and opening into the stator face;
a rotor member comprising a cylindrical body and with a rotor face facing and in contact with the stator face, the rotor member having a rotor channel in the rotor face, wherein the rotor member is rotatable with respect to the stator member about a rotation axis, such that in a conducting position, the rotor channel interconnects the at least two stator channels to be in fluid communication;
a rotary encoder assembly adapted for determining a rotary position of the rotor member, the rotary encoder assembly comprising an encoder member and an encoder module, which is adapted to sense a rotary position of the encoder member;
a housing for accommodating the rotor member and the stator member;
a rotary bearing for mounting the rotor member in the housing;
wherein the encoder member is arranged adjacent to the bearing;
wherein the encoder member is rigidly connected to the rotor member and surrounds the rotor member,
wherein the cylindrical body comprises an opening for receiving a shaft of the rotary valve,
wherein the encoder member surrounds the opening for receiving the shaft; and
further comprising:
a controller that controls the motor to generate torque and controls a position of the rotor member in closed loop by comparing a position determined by the rotary encoder assembly of the rotor member with a desired position and by stopping the motor, when the desired position is reached.

* * * * *